(12) United States Patent
Jeon et al.

(10) Patent No.: US 9,158,562 B2
(45) Date of Patent: Oct. 13, 2015

(54) METHOD AND APPARATUS FOR SUPPORTING VIRTUALIZATION OF LOADABLE MODULE

(71) Applicant: Electronics and Telecommunications Research Institute, Daejeon (KR)

(72) Inventors: Seung-Hyub Jeon, Daejeon (KR); Kwang-Won Koh, Daejeon (KR); Kang-Ho Kim, Daejeon (KR); Chei-Yol Kim, Daejeon (KR); Chang-Won Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 245 days.

(21) Appl. No.: 13/837,496

(22) Filed: Mar. 15, 2013

(65) Prior Publication Data

US 2013/0326514 A1    Dec. 5, 2013

(30) Foreign Application Priority Data

May 31, 2012  (KR) .................. 10-2012-0058195

(51) Int. Cl.
*G06F 9/455* (2006.01)
*G06F 9/445* (2006.01)

(52) U.S. Cl.
CPC ........ *G06F 9/45504* (2013.01); *G06F 9/44521* (2013.01); *G06F 9/4552* (2013.01)

(58) Field of Classification Search
CPC .................................................. G06F 9/45504
See application file for complete search history.

(56) References Cited

U.S. PATENT DOCUMENTS

| 5,881,290 | A  | * | 3/1999  | Ansari et al. ................. 717/136 |
| 6,836,877 | B1 | * | 12/2004 | Dupenloup ................... 716/103 |
| 2002/0133810 | A1 | * | 9/2002 | Giles et al. ................... 717/138 |
| 2007/0300219 | A1 | * | 12/2007 | Devaux ........................... 718/1 |
| 2010/0161978 | A1 | * | 6/2010 | Bacher .......................... 713/166 |
| 2012/0144376 | A1 | * | 6/2012 | Van Eijndhoven et al. ... 717/146 |
| 2013/0125115 | A1 | * | 5/2013 | Tsirkin et al. .................... 718/1 |
| 2013/0145363 | A1 | * | 6/2013 | Eidus et al. ...................... 718/1 |

FOREIGN PATENT DOCUMENTS

KR    10-2011-0041087    4/2011

OTHER PUBLICATIONS

Kernel, https://en.wiktionary.org/wiki/kernel, Jan. 8, 2015.*
Object code, http://en.wikipedia.org/wiki/Object_code, Jan. 9, 2015.*
Table, https://en.wiktionary.org/wiki/table, Jan. 9, 2015.*
Instruction, https://en.wiktionary.org/wiki/instruction, Jan. 8, 2015.*
Joshua Levasseur et al., "Pre-Virtualization: Slashing the Cost of Virtualization," Technical Report, 2005.

* cited by examiner

*Primary Examiner* — Emerson Puente
*Assistant Examiner* — Charlie Sun
(74) *Attorney, Agent, or Firm* — Staas & Halsey LLP (57) ABSTRACT

Disclosed herein is a method and apparatus for supporting virtualization. In the method, conversion of source code of a loadable module is initiated. A virtualization-sensitive instruction is searched for during the conversion of the source code. If the virtualization-sensitive instruction has been found, a virtualization-sensitive instruction table is generated based on the found virtualization-sensitive instruction. The virtualization-sensitive instruction is substituted with an instruction recognizable in a privileged mode, based on the generated virtualization-sensitive instruction table. The loadable module is loaded and executed in a kernel. Accordingly, the present invention supports virtualization, thus minimizing overhead occurring in full virtualization, and guaranteeing the high performance provided by para-virtualization without modifying a source.

16 Claims, 7 Drawing Sheets

METHOD AND APPARATUS FOR SUPPORTING VIRTUALIZATION OF LOADABLE MODULE

CROSS REFERENCE TO RELATED APPLICATION

This application claims the benefit of Korean Patent Application No. 10-2012-0058195, filed on May 31, 2012, which is hereby incorporated by reference in its entirety into this application.

BACKGROUND OF THE INVENTION

1. Technical Field

The present invention relates generally to a method and apparatus for supporting virtualization and, more particularly, to technology for supporting the virtualization of a loadable kernel module in an Advanced Reduced instruction set computer (RISC) Machine (ARM) computing structure.

2. Description of the Related Art

Virtualization technology is initiated by making efforts to increase server utilization for multiple users and the application range thereof has been gradually extended to various fields, such as network virtualization and storage virtualization.

Virtualization technology denotes technology for virtualizing and providing the physical sub-structure of a computer system. The physical sub-structure of the computer system begins with the task of virtualizing an Instruction Set Architecture (ISA) that is a machine language-level interface which the computer system can accommodate. The reason for this is that all interfaces capable of recognizing the status of hardware must be blocked so that each software component at a higher level can be individually operated. Such a virtualization technique is similar to emulation, but is different from emulation in that some instructions operate directly on hardware. Emulation enables all hardware operations to be implemented as software, whereas virtualization enables emulation to be applied only to some instructions.

Virtualization-sensitive instructions that are executed on a hardware structure capable of providing virtualization include control-sensitive instructions and behavior-sensitive instructions.

Such a control-sensitive instruction corresponds to an instruction for changing the principal status (or register values) of a Central Processing Unit (CPU) in such a way that the instruction itself changes the base address or the like of virtual memory, and may include instructions for changing a privilege level or changing the base address of virtual memory.

Such a behavior-sensitive instruction corresponds to an instruction for executing different operations depending on the status of the CPU, and may include memory read/write instructions required to access different addresses of physical memory if a virtual address space is changed.

In a device structure for supporting virtualization, all virtualization-sensitive instructions must be defined as privileged instructions. Privileged instructions can be executed only at a privileged level, and cause traps when the privileged instructions are executed in a user mode which is a non-privileged mode.

That is, when a privileged instruction is executed in a non-privileged mode, it is recognized that an exceptional case has occurred, so that the control of the CPU is transferred to a trap handler.

The structure of a virtual machine for supporting virtualization operates individual guest Operating Systems (OSs) in a user mode that is a non-privileged mode so that all virtualization-sensitive instructions are executed under the control of a virtual machine. Instructions causing traps are executed indirectly by a virtual machine monitor, instead of hardware. Further, other instructions are classified as innocuous instructions and are permitted to be directly executed on hardware without requiring emulation, thus preventing the performance of virtualization from being deteriorated. Further, unlike emulation, the virtualization technique enables only some instructions to be emulated, thus minimizing the deterioration of performance while independently maintaining the status of the CPU of each virtual machine.

Virtualization methods can be mainly classified as full virtualization and para-virtualization.

Para-virtualization technology modifies the source code of an OS and enables a plurality of OSs to run on a single hardware component. By means of para-virtualization, when a typical process operating on an OS accesses system resources, a form identical to the use of a system call is implemented. In particular, the source code of an OS that uses instructions requiring special authority (a privilege), such as the switching of execution modes and interrupt/exception processing, is directly modified, and is replaced with a hyper call having a form similar to a system call, so that all instructions requiring special authority in a guest OS are eliminated. By way of this, the guest OS can be implemented using only innocuous instructions, and instructions are directly executed on the processor, unlike full virtualization that is performed based on emulation or code conversion technology, thereby decreasing the deterioration of performance.

Full virtualization is performed by a virtual machine without modifying a guest OS. For this, full virtualization uses emulation for implementing all of the hardware as software, or code conversion technology for replacing instructions requiring special authority with innocuous instructions. In the case of emulation, since both innocuous instructions and privileged instructions are implemented as software, execution speed is very slow, but other processors or hardware platforms can be used, and thus emulation has been widely used to configure an embedded development environment. Code conversion technology denotes technology for dynamically converting privileged instructions of an unmodified guest OS and executing the instructions in a virtual machine. Such a virtual machine divides the code of the guest OS into base blocks and performs a required code conversion task on the base blocks, without immediately executing the code of the guest OS. Actual execution is achieved by the converted code blocks. Full virtualization using code conversion technology is slower than para-virtualization, but is much faster than emulation, and thus full virtualization has been widely utilized in a large number of commercial products.

However, although full virtualization does not require the modification of an OS, it is problematic in that in the runtime, high overhead occurs due to frequent switching between a user mode and a privileged mode. Further, para-virtualization can improve performance using an Application Programming Interface (API) called a hyper call so as to solve the problem of full virtualization, but it requires cost to port an OS. Therefore, when para-virtualization is applied, the most serious problem arises in that a source must be modified into a hyper call. Further, para-virtualization is also problematic in that whenever the OS is modified, such a modification must be repeatedly performed, and thus high cost is caused.

Therefore, a server virtualization apparatus (disclosed in Korean Patent Application Publication No. 10-2011-0041087) is presented which improves performance by combining technology supporting hardware virtualization with para-virtualization technology. However, this technology cannot efficiently solve the problem of additionally requiring a separate module and having higher manufacturing costs, and the problem of having to repeatedly perform the operation of modifying part of an OS into a hyper call API.

SUMMARY OF THE INVENTION

Accordingly, the present invention has been made keeping in mind the above problems occurring in the prior art, and an object of the present invention is to develop technology for minimizing overhead occurring in full virtualization while solving the disadvantage of para-virtualization, that is, the problem of modifying part of an OS into a hyper call API, in order to support the virtualization of a loadable module.

Therefore, the right of control is rapidly transferred to the virtual machine via a virtualization-sensitive instruction discriminator and a virtualization-sensitive instruction encoder, thus enabling virtualization-sensitive instructions to be processed.

In accordance with an aspect of the present invention to accomplish the above object, there is provided a method of supporting virtualization of a loadable module, the method being performed by a virtualization supporting apparatus, including initiating conversion of source code of a loadable module, searching for a virtualization-sensitive instruction during the conversion of the source code, if the virtualization-sensitive instruction has been found, generating a virtualization-sensitive instruction table based on the found virtualization-sensitive instruction, substituting the virtualization-sensitive instruction with an instruction recognizable in a privileged mode, based on the generated virtualization-sensitive instruction table, and loading and executing the loadable module in a kernel.

In accordance with another aspect of the present invention to accomplish the above object, there is provided an apparatus for supporting virtualization, including a source code conversion unit for converting source code of a loadable module, a virtualization-sensitive instruction discrimination unit for searching for a virtualization-sensitive instruction during conversion of the source code, a virtualization-sensitive instruction storage unit for, if the virtualization-sensitive instruction has been found, generating and storing a virtualization-sensitive instruction table based on the found virtualization-sensitive instruction, a virtualization-sensitive instruction encoder for substituting the virtualization-sensitive instruction with an instruction recognizable in a privileged mode based on the stored virtualization-sensitive instruction table, and a module execution unit for loading the loadable module in a kernel based on the virtualization-sensitive instruction table in which substitution has been performed, and executing the loaded module.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, various embodiments of the present invention will be described in detail with reference to the attached drawings. Further, the terms "unit", "module", and "device" related to components used in the following description are merely assigned for the sake of the simplicity of description of the present specification and may be used together and designed using hardware or software.

Furthermore, embodiments of the present invention will be described in detail with reference to the attached drawings and contents described in the drawings. However, the present invention is not restricted or limited by those embodiments.

Figure 1:
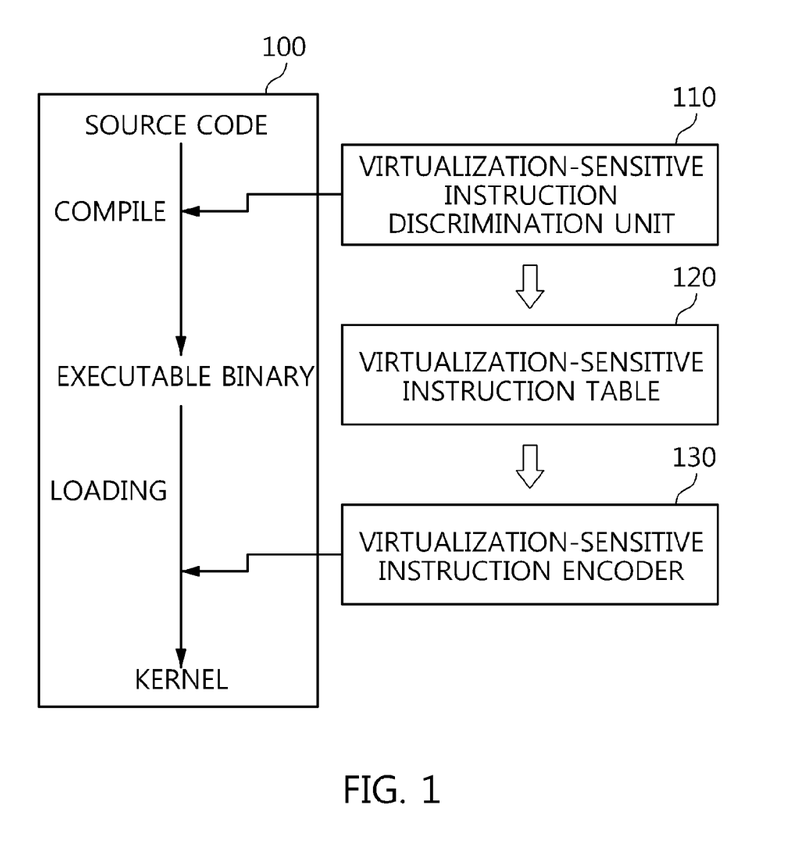
FIG. 1 is a conceptual diagram showing a method of supporting the virtualization of a loadable module according to an embodiment of the present invention.

FIG. 1 is a conceptual diagram showing a method of supporting the virtualization of a loadable module according to an embodiment of the present invention.

In accordance with an embodiment, during the procedure 100 of compiling a typical kernel module and loading the kernel module in a kernel, a loadable module can be loaded into the kernel via a virtualization-sensitive instruction discrimination unit 110, a virtualization-sensitive instruction table 120, and a virtualization-sensitive instruction encoder 120 according to an embodiment of the present invention.

After being compiled, the typical kernel module is loaded in the kernel through a module loader and is executed in the kernel.

However, in a virtualization environment, virtualization-sensitive instructions present in such an added module must be able to be recognized and processed by a virtual machine monitor. Otherwise, an Operating System (OS) performed in an existing virtualization environment may run abnormally.

Therefore, the virtualization-sensitive instruction discrimination unit 110 generates a virtualization-sensitive instruction table 120 by searching for the locations of virtualization-sensitive instructions when source code is converted into instructions executable on a platform.

The virtualization-sensitive instruction table 120 may be included and stored in an executable binary in which the locations of the virtualization-sensitive instructions are included, or may be stored as a file separate from the executable binary.

The virtualization-sensitive instruction encoder 130 may perform substitution for virtualization-sensitive instructions based on the virtualization-sensitive instruction table generated by the virtualization-sensitive instruction discrimination unit.

That is, by the procedure shown in FIG. 1, virtualization-sensitive instructions can be efficiently processed. A method and apparatus for processing such virtualization-sensitive instructions will be described in detail below with reference to the following drawings.

Figure 2:
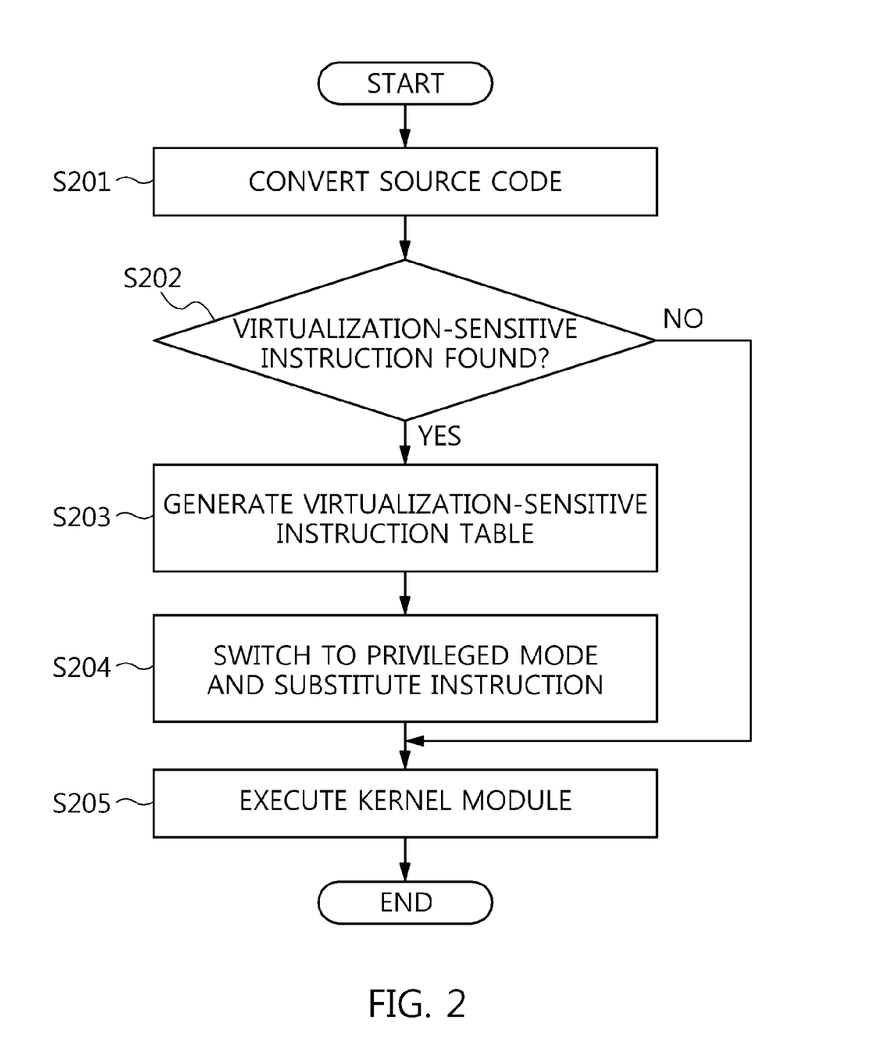
FIG. 2 is a flowchart showing a method of supporting the virtualization of a loadable module according to an embodiment of the present invention.

FIG. 2 is a flowchart showing a method of supporting the virtualization of a loadable module according to an embodiment of the present invention.

In accordance with this embodiment, in the method of supporting the virtualization of a loadable module using a virtualization supporting apparatus, the conversion of source code of the loadable module is initiated by the source code conversion unit of the virtualization supporting apparatus at step S201.

Next, virtualization-sensitive instructions are searched for during the conversion of the source code by the source code conversion unit at step S202.

As a result of the search, if virtualization-sensitive instructions are found, a virtualization-sensitive instruction table is generated based on the found virtualization-sensitive instructions at step S203.

The virtualization-sensitive instruction table may be included or stored in an executable binary in which the locations of the virtualization-sensitive instructions are included, or may be stored as a file separate from the executable binary.

Next, the virtualization-sensitive instructions are substituted with instructions recognizable in a privileged mode, based on the generated virtualization-sensitive instruction table at step S204.

The instructions recognizable in the privileged mode may be instructions that are not recognizable by ARM computing.

Further, the loadable module is loaded and executed in the kernel at step S205.

That is, when the loadable module is loaded in the kernel and the substituted instructions in the module are executed through this procedure, the virtual machine monitor fetches the right of control, and performs suitable processing complying with the instructions. The processing procedure thereof will be described in detail later with reference to FIG. 6.

Figure 3:
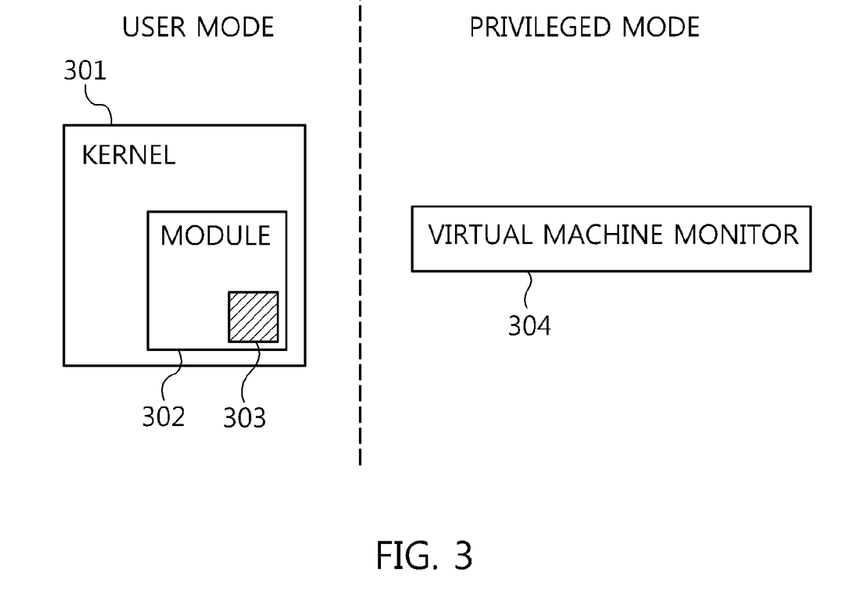
FIG. 3 is a diagram showing the execution modes of a loadable module according to an embodiment of the present invention.

FIG. 3 is a diagram showing the execution modes of a loadable module according to an embodiment of the present invention.

In accordance with this embodiment, the virtualization supporting apparatus capable of processing virtualization-sensitive instructions may include a user mode and a privileged mode as execution modes.

The user mode corresponds to a mode in which innocuous instructions are executed, and the privileged mode corresponds to a mode in which software is capable of performing limited operations of manipulating important parts of a system, such as memory devices and input/output (I/O) ports. Therefore, in the privileged mode, an application program cannot be executed, but a kernel that is a core part of an OS, or a program (a device driver) for controlling devices attached to the system can be executed.

That is, all virtualization-sensitive instructions are defined as privileged instructions and are designated to be executable only at a privileged level. When virtualization-sensitive instructions are executed in the user mode that is a non-privileged mode, traps occur. That is, the case where privileged instructions are executed in the user mode is recognized as an exceptional case, so that the execution mode is switched to the privileged mode, and the privileged instructions can be executed through a virtual machine monitor.

The virtual machine monitor can include a virtualization level or a virtualization layer, and can directly control the status of a physical machine.

Therefore, in accordance with the embodiment of the present invention, when a loadable module 302 is loaded and executed in the kernel 301 of the virtualization supporting apparatus, and a substituted instruction 303 in the module is executed, a virtual machine monitor 304 fetches the right of control, and is then capable of performing processing complying with the substituted instruction 303.

Figure 4:
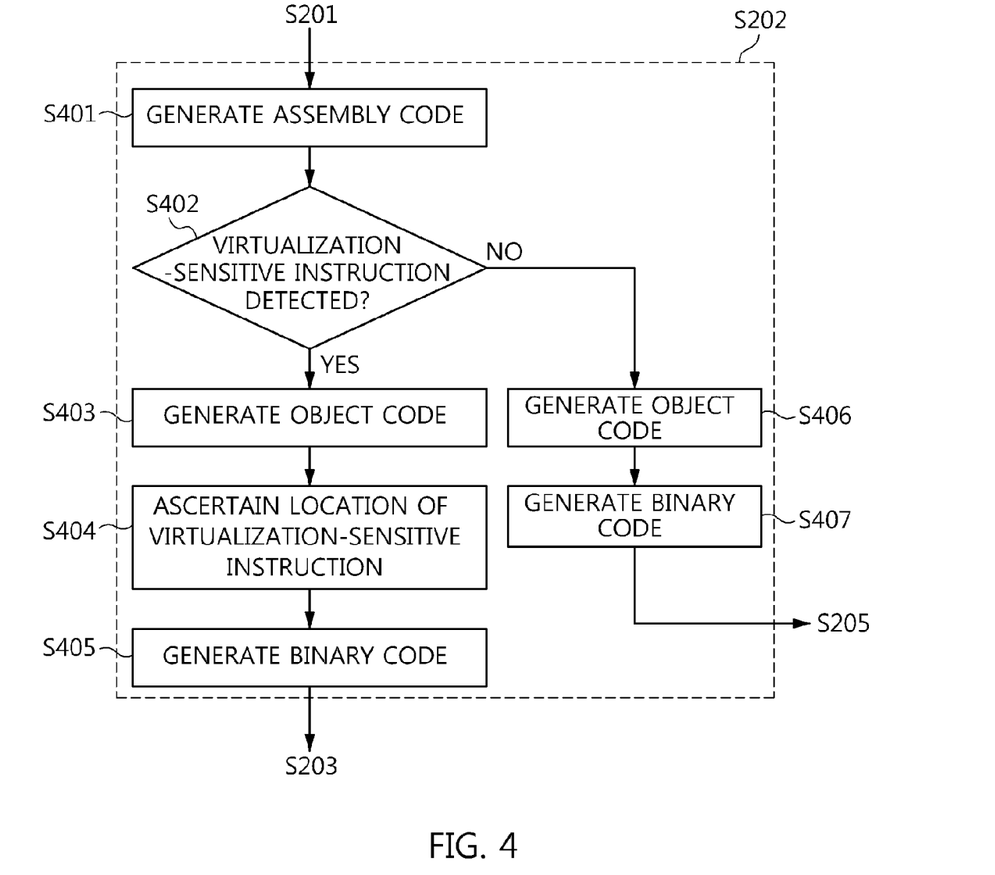
FIG. 4 is a flowchart showing in detail the virtualization-sensitive instruction ascertainment step of FIG. 2.

FIG. 4 is a flowchart showing in detail the virtualization-sensitive instruction search step of FIG. 2.

In accordance with this embodiment, the step of determining whether a virtualization-sensitive instruction has been found can be performed using steps shown in FIG. 4.

Therefore, if the conversion of source code has been initiated, the source code is converted to generate assembly code at step S401, and a virtualization-sensitive instruction can be detected in the generated assembly code at step S402.

Therefore, at the detection step S402, when the virtualization-sensitive instruction has been detected, the generated assembly code is converted to generate object code at step S403. Thereafter, the location of the detected virtualization-sensitive instruction is ascertained at step S404.

Further, the generated object code is converted to generate binary code at step S405.

In contrast, at the detection step S402, if a virtualization-sensitive instruction is not detected, the generated assembly code is converted to generate object code at step S406. The typical operation of immediately converting the generated object code to generate binary code is performed at step S407.

That is, the procedure of compiling the source code is configured to perform compilation, assembly, and linking procedures. The determination of a virtualization-sensitive instruction can be performed at a machine language level, so that after the assembly code has been generated, it is possible to determine whether a current instruction is a virtualization-sensitive instruction, based on the classification of virtualization-sensitive instructions.

Therefore, during the procedure of generating the object code from the assembly code and generating actual binary code, a virtualization-sensitive instruction can be found from the assembly code. Further, during the procedure of generating an actual binary, the location of the sensitive instruction is ascertained, and then a virtualization-sensitive instruction table can be generated.

Figure 5:
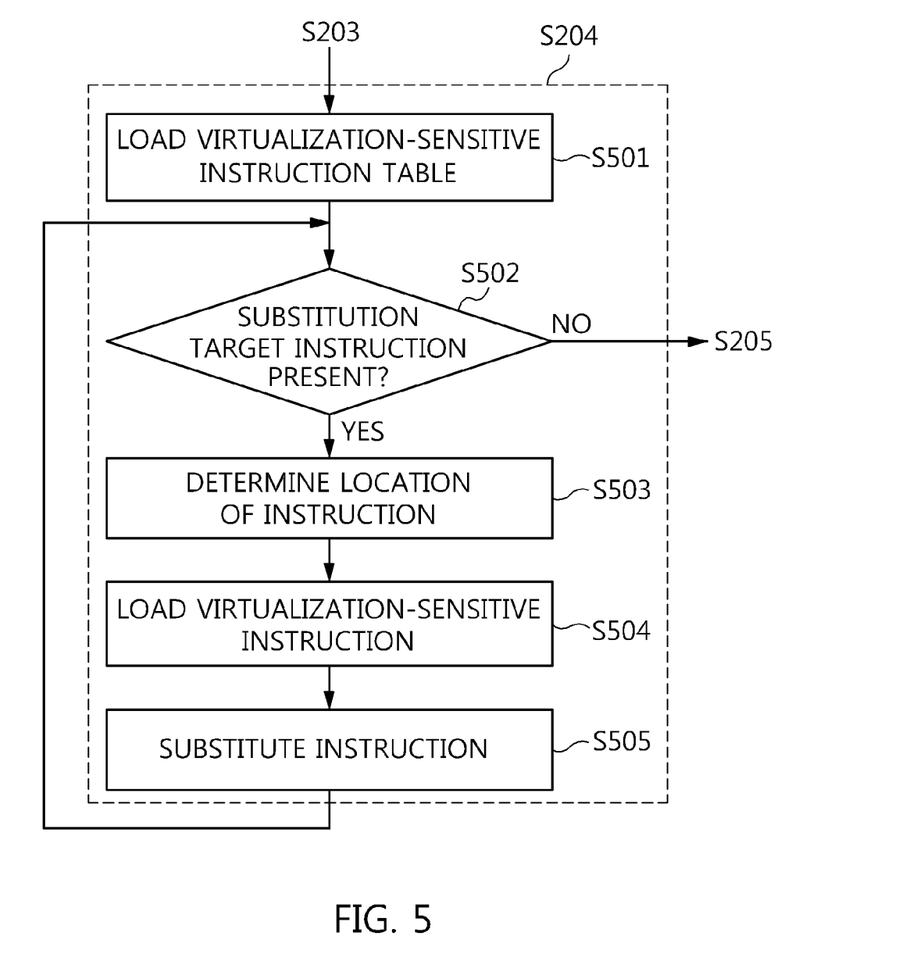
FIG. 5 is a flowchart showing the instruction substitution step of FIG. 2.

FIG. 5 is a flowchart showing in detail the instruction substitution step of FIG. 2.

In accordance with an embodiment, the step of substituting the virtualization-sensitive instruction with an instruction recognizable in a privileged mode can be performed using steps shown in FIG. 5.

That is, when the virtualization-sensitive instruction table is generated, the virtualization-sensitive instruction table is loaded at step S501, and it is determined whether a target instruction to be substituted with an instruction recognizable in the privileged mode is present in the loaded virtualization-sensitive instruction table at step S502.

If it is determined at step S502 that the substitution target instruction is present, the location of the substitution target instruction is determined at step S503, the substitution target instruction is loaded from the determined location at step S504, and the loaded substitution target instruction is substituted with an instruction recognizable in the privileged mode at step S505.

In contrast, if it is determined at step S502 that a target instruction to be substituted with an instruction recognizable in the privileged mode is not present in the loaded virtualization-sensitive instruction table, the loaded virtualization-sensitive instruction table can be loaded in the kernel, and the execution of the module can be initiated. That is, when substitution is not required any more, the procedure of loading the table in the kernel is performed.

Further, upon performing substitution, it is also possible to read an instruction, determine which type of instruction has been read, and substitute the sensitive instruction with an instruction that is not recognizable by an ARM computing system. Through this operation, the kernel module execution procedure, as shown in FIG. 6, can be performed as follows.

Figure 6:
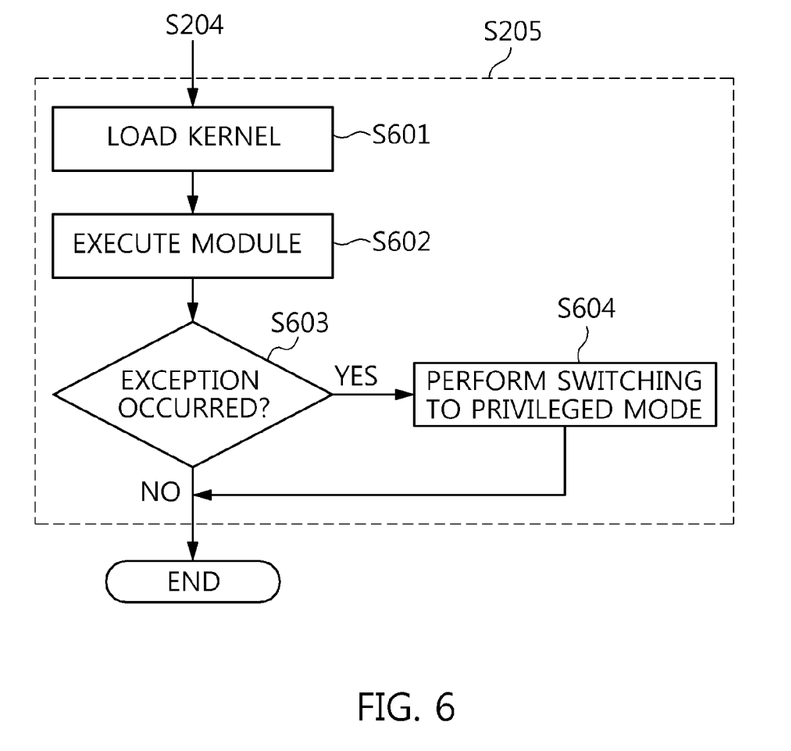
FIG. 6 is a flowchart showing in detail the kernel module execution step of FIG. 2.

FIG. 6 is a flowchart showing the kernel module execution step of FIG. 2 in detail.

In accordance with this embodiment, the step of loading and executing a loadable module in a kernel can be performed using the steps shown in FIG. 6.

That is, the loadable module is loaded in the kernel at step S601, and the execution of the loaded module is initiated at step S602.

Next, during the execution of the loaded module, it is determined whether an exception has occurred step S603. If an exception has occurred, the execution mode is switched to a privileged mode, and the module is executed at step S604.

Further, at the step S604 of switching the execution mode to the privileged mode and executing the module, the right of control is transferred to the virtual machine monitor, thus switching a control mode to the privileged mode.

That is, while the module is loaded and executed in the kernel, if the instruction substituted with an instruction that cannot be recognized by an ARM computing system is executed, an undefined exception occurs on ARM, and switching to the privileged mode is conducted. By means of this switching, an instruction causing the undefined exception can be known, and the virtual machine monitor can detect and execute a virtualization-sensitive instruction desired to be executed on the module on the basis of the known instruction.

Figure 7:
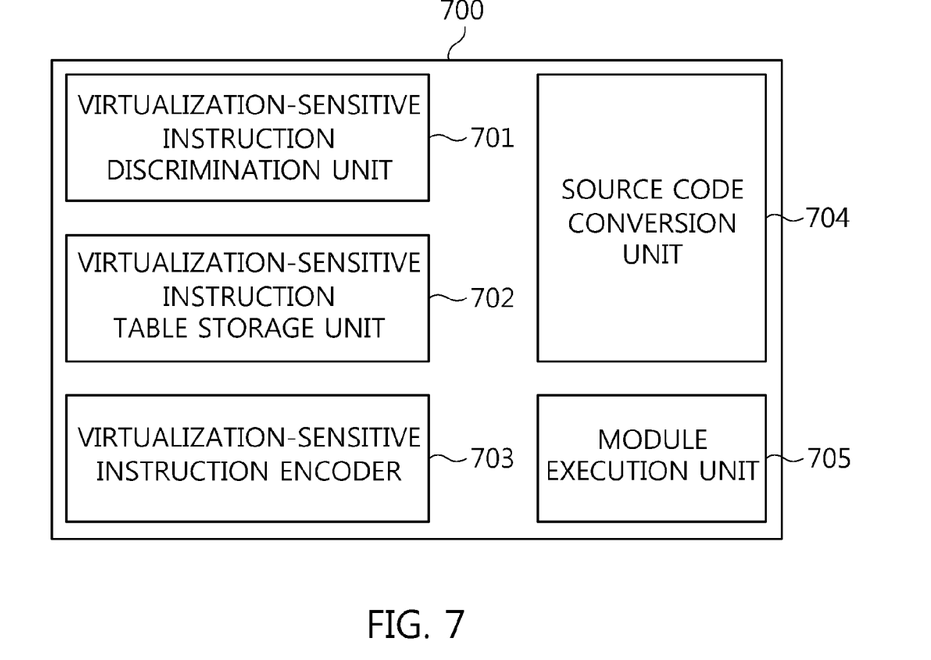
FIG. 7 is a diagram showing the configuration of an apparatus for supporting the virtualization of a loadable module according to an embodiment of the present invention.

FIG. 7 is a diagram showing the configuration of an apparatus for supporting the virtualization of a loadable module according to an embodiment of the present invention.

A virtualization supporting apparatus 700 according to an embodiment of the present invention includes a virtualization-sensitive instruction discrimination unit 701, a virtualization-sensitive instruction table storage unit 702, a virtualization-sensitive instruction encoder 703, a source code conversion unit 704, and a module execution unit 705.

The source code conversion unit 704 may convert the source code of the loadable module.

The virtualization-sensitive instruction discrimination unit 701 may discriminate virtualization-sensitive instructions during the conversion of the source code by the source code conversion unit.

Further, if the source code is converted to generate assembly code by the source code conversion unit, the virtualization-sensitive instruction discrimination unit 701 detects virtualization-sensitive instructions from the generated assembly code. If the virtualization-sensitive instructions have been detected, the virtualization-sensitive instruction discrimination unit 701 can convert the generated assembly code to generate object code, ascertain the locations of the virtualization-sensitive instructions, and convert the generated object code to generate binary code.

If the virtualization-sensitive instructions have been detected by the virtualization-sensitive instruction discrimination unit 701, the virtualization-sensitive instruction table storage unit 702 can generate and store a virtualization-sensitive instruction table based on the virtualization-sensitive instructions.

Further, the virtualization-sensitive instruction table can be included and stored in an executable binary in which the locations of the virtualization-sensitive instructions are included, or can be stored as a file separate from the executable binary.

The virtualization-sensitive instruction encoder 703 can substitute the virtualization-sensitive instructions with instructions recognizable in a privileged mode on the basis of the virtualization-sensitive instruction table stored in the virtualization-sensitive instruction table storage unit 702. The instructions recognizable in the privileged mode can include instructions that are not recognizable by ARM computing.

Further, if the virtualization-sensitive instruction table is loaded, and it is determined that a target instruction to be substituted with the instruction recognizable in the privileged mode is present in the loaded virtualization-sensitive instruction table, the virtualization-sensitive instruction encoder 703 can determine the location of the substitution target instruction, load the substitution target instruction from the determined location, and substitute the loaded substitution target instruction with the instruction recognizable in the privileged mode. In contrast, if it is determined that a target instruction to be substituted with the instruction recognizable in the privileged mode is not present in the loaded virtualization-sensitive instruction table, the module execution unit 705 can load the virtualization-sensitive instruction table in the kernel and execute the corresponding module in the kernel.

The module execution unit 705 can load the loadable module in the kernel on the basis of the virtualization-sensitive instruction table in which substitution has been performed by the virtualization-sensitive instruction encoder 703, and execute the loaded module.

Further, the module execution unit 705 loads and executes the loadable module in the kernel, and if an exception occurs during the procedure of executing the loaded module, can switch an execution mode to the privileged mode and execute the module in the privileged mode. That is, the right of control is transferred to the virtual machine monitor, thus enabling a control mode to be switched to the privileged mode.

According to the present invention, there are advantages in that virtualization-sensitive instructions are found from a loadable module and are substituted for, via a virtualization-sensitive discriminator and a virtualization-sensitive instruction encoder, and the right of control is transferred to a virtual machine monitor to recover the substituted instructions, so that suitable execution corresponding to the instructions is guaranteed, thus minimizing overhead occurring in full virtualization, and guaranteeing the high performance provided by para-virtualization without modifying a source.

Although the preferred embodiments of the present invention have been disclosed for illustrative purposes, those skilled in the art will appreciate that the present invention is not limited by the above-described specific embodiments and various modifications are possible, without departing from the scope and spirit of the invention as disclosed in the accompanying claims. These modifications should not be understood separately from the technical spirit or prospect of the present invention.

What is claimed is:

1. A method of supporting virtualization of a loadable module, the method being performed by a virtualization supporting apparatus, comprising:
    initiating conversion of source code of a loadable module;
    searching for a virtualization-sensitive instruction of the loadable module during the conversion of the source code;
    generating a virtualization-sensitive instruction table based on the found virtualization-sensitive instruction when the virtualization sensitive instruction is found by the searching;
    substituting, based on the generated virtualization-sensitive instruction table, the virtualization-sensitive instruction of the loadable module with a corresponding instruction recognizable in a privileged mode, wherein the corresponding instruction does not change an algorithm of the source code and complies with the virtualization-sensitive instruction of the loadable module; and
loading and executing the loadable module having the substituted instruction recognizable in the privileged mode in a kernel.

2. The method of claim 1, wherein the searching for the virtualization-sensitive instruction comprises:
generating assembly code by converting the source code, and detecting the virtualization-sensitive instruction from the generated assembly code; and
if the virtualization-sensitive instruction is detected, converting the generated assembly code to generate object code, ascertaining a location of the detected virtualization-sensitive instruction, and converting the generated object code to generate binary code.

3. The method of claim 1, wherein the substituting the virtualization-sensitive instruction with the corresponding instruction recognizable in the privileged mode comprises:
loading data of the generated virtualization-sensitive instruction table;
determining a location of the substitution target instruction when a target instruction to be substituted with the corresponding instruction recognizable in the privileged mode is present in the loaded data of the virtualization-sensitive instruction table; and
loading the substitution target instruction from the determined location, and substituting the loaded substitution target instruction with the corresponding instruction recognizable in the privileged mode.

4. The method of claim 3, wherein the determining the location of the substitution target instruction comprises loading and executing data of the loaded virtualization-sensitive instruction table in the kernel when a target instruction to be substituted with the corresponding instruction recognizable in the privileged mode is not present in the loaded virtualization-sensitive instruction table.

5. The method of claim 1, wherein the loading and executing the loadable module in the kernel comprises:
loading the loadable module in the kernel;
executing the loaded module; and
if an exception occurs during execution of the loaded module, performing switching to the privileged mode and executing the module.

6. The method of claim 1, wherein the virtualization-sensitive instruction table is included and stored in an executable binary in which a location of the virtualization-sensitive instruction is included, or stored as a file separate from the executable binary.

7. The method of claim 5, wherein the performing switching to the privileged mode and the executing the module comprises transferring a right of control to a virtual machine monitor, thus switching a control mode to the privileged mode.

8. The method of claim 1, wherein the corresponding instruction recognizable in the privileged mode is an instruction that is not recognizable by Advanced Reduced instruction set computer (RISC) Machine (ARM) computing.

9. An apparatus for supporting virtualization, comprising:
a hardware processor configured to:
convert source code of a loadable module;
search for a virtualization-sensitive instruction of the loadable module during conversion of the source code;
generate and store a virtualization-sensitive instruction table, based on the virtualization-sensitive instruction, when the virtualization-sensitive instruction is found by the search;
substitute, based on the stored virtualization-sensitive instruction table, the virtualization-sensitive instruction of the loadable module with a corresponding instruction recognizable in a privileged mode, wherein the corresponding instruction does not change an algorithm of the source code and complies with the virtualization-sensitive instruction of the loadable module; and
load and execute the loadable module having the substituted corresponding instruction recognizable in the privileged mode in a kernel.

10. The apparatus of claim 9, wherein the hardware processor is configured to detect the virtualization-sensitive instruction from the generated assembly code when the source code is converted to generate assembly code, and generate object code by converting the generated assembly code, ascertain a location of the detected virtualization-sensitive instruction, and generate binary code by converting the generated object code when the virtualization-sensitive instruction is detected.

11. The apparatus of claim 9, wherein the hardware processor is configured to load data of the generated virtualization-sensitive instruction table, and determine a location of the substitution target instruction, load the substitution target instruction from the determined location, and substitute the loaded substitution target instruction with the corresponding instruction recognizable in the privileged mode when a target instruction to be substituted with the corresponding instruction recognizable in the privileged mode is present in the loaded data of the virtualization-sensitive instruction table.

12. The apparatus of claim 11, wherein the hardware processor is configured to load data of the virtualization-sensitive instruction table in the kernel and execute the module when a target instruction to be substituted with the corresponding instruction recognizable in the privileged mode is not present in the loaded data of the virtualization-sensitive instruction table.

13. The apparatus of claim 9, wherein the hardware processor is configured to load and execute the loadable module in the kernel, and perform switching to the privileged mode and execute the module when an exception occurs during execution of the loaded module.

14. The apparatus of claim 9, wherein the virtualization-sensitive instruction table is included and stored in an executable binary in which a location of the virtualization-sensitive instruction is included, or stored as a file separate from the executable binary.

15. The apparatus of claim 13, wherein the hardware processor transfers a right of control to a virtual machine monitor, thus switching a control mode to the privileged mode.

16. The apparatus of claim 9, wherein the corresponding instruction recognizable in the privileged mode is an instruction that is not recognizable by Advanced Reduced instruction set computer (RISC) Machine (ARM) computing.

* * * * *